United States Patent [19]

Nicholson

[11] 4,371,661

[45] Feb. 1, 1983

[54] SEMI-CONTINUOUS PROCESS FOR MAKING STAR-BLOCK COPOLYMERS

[75] Inventor: Harold L. Nicholson, West Chester, Pa.

[73] Assignee: Atlantic Richfield Company, Los Angeles, Calif.

[21] Appl. No.: 362,188

[22] Filed: Mar. 26, 1982

Related U.S. Application Data

[63] Continuation-in-part of Ser. No. 235,243, Feb. 17, 1982, abandoned.

[51] Int. Cl.³ .......................................... C08F 297/04
[52] U.S. Cl. ...................................... 525/53; 525/314
[58] Field of Search ............................ 525/53, 314

[56] References Cited

U.S. PATENT DOCUMENTS

| | | | |
|---|---|---|---|
| 3,639,517 | 2/1972 | Kitchen | 525/314 |
| 3,985,830 | 10/1976 | Fetters | 525/314 |
| 4,086,298 | 4/1978 | Fahrbach | 525/314 |

*Primary Examiner*—Paul R. Michl
*Attorney, Agent, or Firm*—Lewis J. Young

[57] ABSTRACT

A semi-continuous process for the preparation of star-block copolymers of 25-55% by weight of monovinyl aromatic compound and 45-75% by weight of conjugated diene monomer has been developed. The process reduces the time needed to produce the copolymer by shortening reaction time and eliminating the need for costly cleanout between runs.

3 Claims, No Drawings

SEMI-CONTINUOUS PROCESS FOR MAKING STAR-BLOCK COPOLYMERS

CROSS-REFERENCE TO RELATED APPLICATION

This application is a continuation-in-part of application Ser. No. 235,243, filed Feb. 17, 1982, now abandoned.

BACKGROUND OF THE INVENTION

The present invention relates to a semi-continuous process for making elastomeric star-block copolymers.

Highly branched block copolymers, sometimes called star-block copolymers, are old in the art of anionic polymerization. These star-block copolymers are prepared by first forming linear block polymer having active lithium atom on one end of the polymer chain. These active, linear polymer chains are then coupled by the addition of a polyfunctional compound having at least three reactive sites capable of reacting with the carbon to lithium bond on the polymer chains to add the polymer chain onto the functional groups of the compound.

Zelinski, U.S. Pat. No. 3,280,084, polymerized butadiene with butyllithium initiator to form B-Li blocks (where B is polybutadiene) which when coupled with 0.02 to 1 part by weight per 100 parts of monomers of divinylbenzene gave starblock copolymers having polydivinylbenzene nuclei and several identical arms of polybutadiene branching therefrom. The arms can also be either random or block copolymers of styrene and butadiene (from A-B-Li blocks, where A is polystyrene segment) where the diene is the major component.

Zelinski, U.S. Pat. No. 3,281,383, teaches similar star-block copolymers to those in U.S. Pat. No. 3,280,084, except that coupling agents such as polyepoxy compounds, polyacids, polyaldehydes, etc., are used.

Childers, U.S. Pat. No. 3,637,554, prepares rubbery starblock copolymers having nuclei formed from polyepoxides, polyisocyanates, polyimines, etc., and idential arms from B-Li and A-B-Li.

Fetters et al., U.s. Pat. No. 3,985,830, discloses a product having a nucleus of more than one molecule of m-divinylbenzene and at least three polymeric arms, each being a block copolymer of conjugated diene and monovinyl aromatic monomers wherein said conjugated diene block is linked to said nucleus.

The above patents all suffer from the disadvantage of being lengthy batch processes which require cleaning out of the batch reactor after each run.

SUMMARY OF THE INVENTION

We have now found that the length of each run needed to prepare the star-block copolymers can be shortened considerably and the need to clean out the reactor eliminated by going to a semi-continuous process.

The process involves four separate reactors arranged such that rapid transfer of the contents of each reactor to another reactor is possible. Each reactor is used only for a specific portion of the polymerization and hence does not need cleaning out between consecutive runs.

DETAILED DESCRIPTION OF THE INVENTION

The copolymers prepared by the instant semicontinuous process contain 25 to 55 percent by weight, preferably 30 to 50 percent by weight, of a monovinyl aromatic compound and 45 to 75 percent by weight, preferably 50 to 70 percent by weight, of a conjugated diene having 4 to 8 carbon atoms. The copolymers have the general formula $(A-B)_{\overline{m}}X$ where A is a non-elastomeric polymer segment based on the total monovinyl aromatic compound, B is an elastomeric segment based on the conjugated diene, m is an integer between 3 and 20, preferably between 7 and 12, and X is the radical of a polyfunctional coupling agent forming the nucleus of the star-block copolymer.

The semi-continuous process involves four separate reactors arranged such that contents of each reactor can be rapidly transferred into the next reactor.

In the first reactor, the total amount of monovinyl aromatic compound is polymerized in an inert solvent using a hydrocarbyllithium initiator to form linear segments (A—Li) of the monovinyl aromatic compound having lithium ions at the ends. The polymerization is allowed to proceed to essential completion.

In the second reactor, the conjugated diene is added and allowed to proceed to essentially complete conversion to form A-B-Li linear blocks.

In the third reactor, a polyfunctional coupling agent is added to the solution of A-B-Li segments and allowed to couple the segments into the radial block copolymer of general formula $(A-B)_{\overline{m}}X$, where m is an integer between 3 and 20, A is the nonelastomeric polymer segment based on the total monovinyl aromatic compound, B is an elastomeric polymer segment based on the conjugated diene and X is the radical of the polyfunctional coupling agent.

In the fourth reactor, the polymerization mixture is terminated by the addition of alcohol, preferably methanol, stabilizers are added and the polymer recovered by known means. The final recovery may be made by storing the stabilized product from the fourth reactor in a storage tank until sufficient product is accumulated to permit devolatilization extrusion to pellets to be undertaken.

At the appropriate time in the preparation of the rubber block in the second reactor, preparation for another run can begin in the first reactor. While the reaction of the initial run continues in the second vessel, a styrene front block for the second run is underway and will follow through the subsequent polymerization steps of the first run, etc. for additional runs in tandem—forming a semi-continuous process.

The monovinyl aromatic compound useful in the invention is preferably styrene, but may be alkyl substituted styrenes which have similar copolymerization characteristics, such as, alphamethylstyrene and the ring substituted methylstyrenes, ethylstyrenes and t-butylstyrene.

The amount of monovinyl aromatic compound useful in the invention is between 25 and 55 percent by weight, and preferably 30 to 50 percent by weight, based on the total weight of monomers utilized.

The hydrocarbyllithium initiators useful in the invention are the known alkyllithium compounds, such as methyllithium, n-butyllithium, sec-butyllithium; the cyclo-alkyllithium compounds, such as cyclo-hexyllithium; and the aryllithium compounds, such as phenyllithium, p-tolyllithium and naphthyllithium. All of the initiator must be added in the first reactor to initiate the monovinyl aromatic compound.

The amounts of hydrocarbyllithium added should be between 0.2 and 10.0 millimoles per mole of monomer. The total amount of initiator used depends on the molecular weight and number of polymer chains desired.

The conjugated dienes useful in the invention are those having from 4 to 8 carbon atoms in the molecule, such as 1,3-butadiene, isoprene, 2,3-dimethyl-1,3-butadiene, piperylene and mixtures thereof.

The polymerization is conducted in an inert hydrocarbon solvent such as isobutane, pentane, cyclohexane, benzene, toluene, xylene and the like. The polymerization is carried out in the absence of air, moisture, or any other impurity which is known to be detrimental to anionic catalyst systems.

The polyfunctional coupling agents suitable for the invention may be any of the materials known to have functional groups which can react with carbon to lithium bonds to add the carbon chain to the functional group. Typical examples of the suitable coupling agents are the polyepoxides, such as epoxidized linseed oil; the polyesters such as diethyl adipate; the polyhalides, such as silicon tetrahalide; the polyisocyanates, such as benzene-1,2,4-triisocyanate; the polyimines, such as tri(1-aziridinyl) phosphine oxide; the polyaldehydes, such as 1,4,7-naphthalene tricarboxaldehyde; the polyketones, such as 2,4,6-heptanetrione; the polyanhydrides, such as pyromellitic dianhydride; and the polyacid chlorides, such as mellitic acid chloride. Especially useful, and preferred herein, are the polyvinyl aromatic compounds such as divinylbenzene, which although only difunctional as monomers, can polymerize to form polyfunctional agents in situ and serve as coupling agents. Suitable are the ortho-, meta-, or paradivinylbenzenes, or mixtures thereof.

The amount and type of coupling agent used is dependent upon the number of polymer chains having lithium terminated ends and the number of arms desired per star-block molecule. Thus, for agents having a fixed number of functional groups such as silicon tetrachloride, an equivalent of agent per equivalent of lithium terminated polymer chains, gives a four armed star-block copolymer. In the case of difunctional agents which polymerize during the coupling reaction, such as divinylbenzene, the amounts of agent to be used must be determined for the conditions of reaction, since the number of equivalent functional sites is variable. However, the amounts will vary only from 0.5 to 3.5 parts by weight, and preferably 0.8 to 2.0 parts by weight, of divinylbenzene per 100 parts by weight of total monomers.

The polymerization process for preparing the star-block copolymers consists essentially of:

a. charging a first reactor with the solvent and all of the initiator and heating to 70° to 85° C., followed by the addition in 3 equal portions, over a period of from 6 to 15 minutes of all of the monovinyl aromatic compound while maintaining the reactor at polymerization temperature;

b. transferring the contents of the first reactor to a second reactor and charging the conjugated diene in 3 equal portions over a period of 27 to 55 minutes while maintaining the second reactor at a temperature of from 65° to 85° C.;

c. transferring the contents of the second reactor to a third reaction and charging 0.5 to 3.5 parts by weight of coupling agent per 100 parts by weight of total monomers and allowing to couple at 65° to 80° C. for 30 to 60 minutes to form star-block copolymer;

d. transferring the contents of the third reactor to a fourth reactor, terminating the polymerization by the addition of methanol and adding stabilizers to the mixture and recovering the polymer by extrusion into polymer pellets; and e. repeating steps a–d as soon as each reactor is emptied into the succeeding reactor.

The monomers in step a and b a added in three portions to allow temperature control without the danger of thermal runaways.

Since each reactor is used for only one reaction, the reactors do not need to be cleaned out between runs and the process can be run more economically and in shorter times than the equal batch process.

The following example is given to illustrate the invention, but not to limit the claims. All parts and percentages are by weight unless otherwise specified.

EXAMPLE I

A. Preparation of a star-block copolymer having 46/54 ratio of styrene/butadiene in the arms by a batch polymerization process A one gallon stirred reactor was charged with 1,800 g. of purified cyclohexane and heated to 70° C. A trace of diphenylethylene (0.2 g) was added to the cyclohexane by means of a hypodermic needle. A solution of secbutyllithium in cyclohexane was added to the reactor portionwise until a permanent orange-yellow color was obtained. The solution was then backtitrated with cyclohexane until the color just disappeared. The solvent and reactor were now ready for the polymerization of monomer. Into the closed reactor was charged 13.7 m moles of secbutyllithium and 308 g of styrene and the reactor held at 60° C. for 20 minutes. Analysis of the solution by U.V. analysis showed that less than 0.01% by weight of the styrene monomer remained. Number average molecular weights ($M_n$) of the polystyrene blocks were determined by Gel Permeation Chromatography to be 28,000. At this point, 361 g of butadiene was added to the reactor and the whole mixture held for 60 minutes to complete the polymerization of the butadiene. The diblock arms thus formed were analyzed by refractive index and found to be 46% by weight styrene and 54% butadiene. There was then added 15.7 ml of divinylbenzene of 55% purity and the whole was held for 75 minutes at 70° C. to complete the linking reaction. The system was terminated by the addition of 1 g of methanol. The polymer solution was transferred to a 5 gallon polyethylene liner, diluted further with acetone and the polymer was precipitated by adding isopropanol under high speed stirring. The polymer was then treated with 0.5 part Polygard HR, a commercial antioxidant, and 0.5 part 2,6, ditert-butyl-4-methylphenol per 100 parts by weight of polymer. The wet polymer was dried at 50° C. in an oven under vacuum at less than 100 microns of mercury.

The resulting star-block polymer was found to have about 8 linear arms. Each arm has $M_n$ of about 60,900, made up of a polystyrene block of $M_n$ 28,000 and a polybutadiene block of $M_n$ 32,900. The divinylbenzene was present in an amount of 1.2 parts per hundred of monomer (phm).

B. Preparation of a star-block copolymer having 46/54 ratio of styrene/butadiene in the arms by a semicontinuous polymerization process.

A one gallon stirred reactor was charged with 1910 g of purified cyclohexane, heated at 83° C. and titrated with sec-butyllithium, as in Example IA, to sterilize solvent and reactor. Into the closed reactor was charged 11.06 millimoles of sec-butyllithium and 294 g of styrene in 3 equal batch additions while maintaining the reactor at 83° C. over 6 minutes to ensure complete polymerization of all the styrene to polystyryl chains terminated by active lithium ions. Number average molecular weight ($M_n$) of the polystyrene blocks were determined by Gel Permeation Chromatography to be 29,400.

The reactor contents were transferred to a second one gallon reactor and this second reactor was then charged with 3 equal 183 g portions of butadiene and allowed to polymerize for times of 12, 12 and 18 minutes, while being maintained at 80° C. The diblock arms thus formed were analyzed by refractive index and found to be 46% by weight styrene and 54% butadiene.

The mixture was then transferred to a third one gallon reactor. There was then added 17.33 ml (66.03 millimoles) of divinylbenzene of 55% purity and the whole held at 80° C. for 30 minutes to complete the coupling reaction. The mixture was then transferred to a fourth reactor and the polymerization terminated by the addition of alcohol as in Example IA. Total reaction time was 78 minutes, compared to 155 minutes for the batch process in Example IA.

The resulting star-block copolymer was found to have about 11 linear arms. Each arm has $M_n$ of about 64,000 made up of a polystyrene block of $M_n$ 29,400 and a polybutadiene block of $M_n$ 34,600.

Again, as in Example IB, it is possible to prepare a second run in the first reactor while the second reactor is being used for the diene polymerization.

The Gel Permeation Chromatograph of the finished star-block copolymers showed that the semi-continuous process described herein gave less polystyrene and diblock copolymers, caused by early termination of the lithium-terminated polymers, than the batch process. It was also apparent, from the fact that the product from semi-continuous process had 11 arms compared to 8 for the comparable batch process, that greater coupling occurred during the semi-continuous process.

What is claimed is:

1. A semi-continuous process for preparing star-block copolymers of a monovinyl aromatic compound and a conjugated diene in an inert hydrocarbon solvent using an anionic initiator consisting essentially of:
   a. charging a first reactor with the solvent and all of the initiator and heating to 70° to 85° C. followed by the addition of, in 3 equal portions, over a period of from 6 to 15 minutes, all of the monovinyl aromatic compound while maintaining the reactor at polymerization temperature to insure complete polymerization of the monovinyl aromatic compound to form blocks of formula A—Li where A is a block of polyvinyl aromatic compound;
   b. transferring the contents to a second reactor and charging all of the conjugated diene in 3 equal portions over a period of 27 to 55 minutes while maintaining said second reactor at a temperature of from 65° to 80° C. to insure complete polymerization of the diene to form chains of formula A-B-Li where B is a block of polydiene;
   c. transferring the contents of said second reactor to a third reactor and charging 0.6 to 3.5 parts by weight of coupling agent per 100 parts by weight of total monomer and allowing to couple at 70°-80° C. for 30 to 60 minutes to form star-block copolymer having formula $(A—B)_m—X$ where A and B are block segments, as above, m is an integer between 3 and 20, and X is the radical of a polyfunctional coupling agent;
   d. transferring the contents of said third reactor to a fourth reactor, terminating the polymerization by the addition of methanol, adding stabilizers and recovering the polymer by extrusion into polymer pellets; and
   e. repeating steps a-d as soon as each reactor is emptied into the succeeding reactor.

2. The process of claim 1 wherein the weight ratio of monovinyl aromatic compound to conjugated diene is from 25/75 to 55/45.

3. The process of claim 1 wherein the monovinyl aromatic compound is styrene, the conjugated diene is butadiene and the polyfunctional coupling agent is selected from o-divinylbenzene, m-divinylbenzene, p-divinylbenzene and mixtures thereof.

* * * * *